(12) United States Patent
Sunter et al.

(10) Patent No.: US 12,302,936 B2
(45) Date of Patent: May 20, 2025

(54) APPARATUS AND METHOD FOR COATING PRODUCT

(71) Applicant: ISHIDA EUROPE LIMITED, Birmingham (GB)

(72) Inventors: Adrian Meredith Sunter, Malvern (GB); Andrew Geoffrey Potter, Oldbury (GB); Lee Michael Vine, Lytchett Matravers (GB)

(73) Assignee: ISHIDA EUROPE LIMITED, Birmingham (GB)

( * ) Notice: Subject to any disclaimer, the term of this patent is extended or adjusted under 35 U.S.C. 154(b) by 0 days.

(21) Appl. No.: 16/462,174

(22) PCT Filed: Nov. 17, 2017

(86) PCT No.: PCT/GB2017/053461
§ 371 (c)(1),
(2) Date: May 17, 2019

(87) PCT Pub. No.: WO2018/091908
PCT Pub. Date: May 24, 2018

(65) Prior Publication Data
US 2019/0328027 A1 Oct. 31, 2019

(30) Foreign Application Priority Data
Nov. 18, 2016 (GB) ..................... 1619581

(51) Int. Cl.
*A23P 20/13* (2016.01)
*A23L 19/18* (2016.01)
(Continued)

(52) U.S. Cl.
CPC ............... *A23P 20/13* (2016.08); *A23L 19/18* (2016.08); *A23P 20/18* (2016.08);
(Continued)

(58) Field of Classification Search
CPC .......... A23P 20/13; A23P 20/28; A23L 19/18; B01F 27/811; B01F 27/813; B01F 35/71
(Continued)

(56) References Cited

U.S. PATENT DOCUMENTS 2,893,332 A 7/1959 Roser et al.
5,690,979 A 11/1997 Bourns et al.
(Continued)

FOREIGN PATENT DOCUMENTS

CN 1356180 A 7/2002
EP 0 231 817 A2 8/1987
(Continued)

OTHER PUBLICATIONS

GB Combined Search and Examination Report under Sections 17 and 18(3) for GB1619581.0, dated Apr. 25, 2017, 5 pages.
(Continued)

*Primary Examiner* — Nikki H. Dees
*Assistant Examiner* — Philip A Dubois
(74) *Attorney, Agent, or Firm* — SQUIRE PATTON BOGGS (US) LLP

(57) ABSTRACT

A blending apparatus for coating product in flavouring is provided. The blending apparatus comprises a product dispenser configured to dispense a falling stream of product, a flavouring dispenser configured to dispense a falling stream of flavouring, and a deflection surface. The deflection surface is configured to deflect at least one of the falling stream of product and falling stream of flavouring, thereby bringing the falling stream of product and the falling stream of flavouring together. A method for coating product in flavouring is also provided. The method comprises the steps of dispensing a falling stream of product from a product dispenser, dispensing a falling stream of flavouring from a flavouring dispenser, deflecting the falling stream of product
(Continued)

and the falling stream of flavouring using a deflection surface so as to bring the falling stream of product and the falling stream of flavouring together, thereby coating the product in the flavouring.

19 Claims, 11 Drawing Sheets

(51) Int. Cl.
    *A23P 20/18*     (2016.01)
    *B01F 27/81*     (2022.01)
    *B01F 35/71*     (2022.01)
    *B01F 35/75*     (2022.01)

(52) U.S. Cl.
    CPC ........ *B01F 27/8111* (2022.01); *B01F 27/813* (2022.01); *B01F 35/71731* (2022.01); *B01F 35/7176* (2022.01); *B01F 35/71805* (2022.01); *B01F 35/7547* (2022.01)

(58) Field of Classification Search
    USPC .......................................................... 426/295
    See application file for complete search history.

(56) References Cited

U.S. PATENT DOCUMENTS

| | | | | |
|---|---|---|---|---|
| 2002/0159329 A1* | 10/2002 | Johanson | ................ | B01F 25/80 |
| | | | | 366/341 |
| 2002/0197353 A1* | 12/2002 | Charles | ................ | A23P 20/15 |
| | | | | 426/72 |
| 2007/0237893 A1* | 10/2007 | Moore | ................ | A23G 3/0095 |
| | | | | 427/299 |
| 2007/0259076 A1 | 11/2007 | Meier et al. | | |

FOREIGN PATENT DOCUMENTS

| GB | 2284363 A | | 6/1995 | |
|---|---|---|---|---|
| GB | 2409144 | * | 6/2005 | ................ A23P 1/08 |
| GB | 2409144 A | | 6/2005 | |
| JP | 2002-330703 | | 11/2002 | |
| WO | 02/41715 A2 | | 5/2002 | |

OTHER PUBLICATIONS

International Search Report (ISR) and Written Opinion of the International Searching Authority of PCT/GB2017/053461 dated Feb. 16, 2018, 14 pages.

International Preliminary Report on Patentability (IPRP) of the International Preliminary Examining Authority for PCT/GB2017/053461, dated Feb. 19, 2019, 21 pages.

English translation of Chinese First Office Action for China Patent Application No. 2017800828381, 8 pages, dated Dec. 2, 2021.

English translations of Notice of Reasons for Refusal for Japanese Patent Application No. JP 2019-526503, 8 pages, dated Nov. 4, 2021.

Examination Report, Communication pursuant to Article 94(3) EPC for European Application No. 17808989.2, 6 pages, dated May 18, 2021.

Communication pursuant to Article 94(3) EPC (Examination Report) issued in corresponding European Patent Application No. 17 808 989.2 dated Mar. 14, 2024.

* cited by examiner

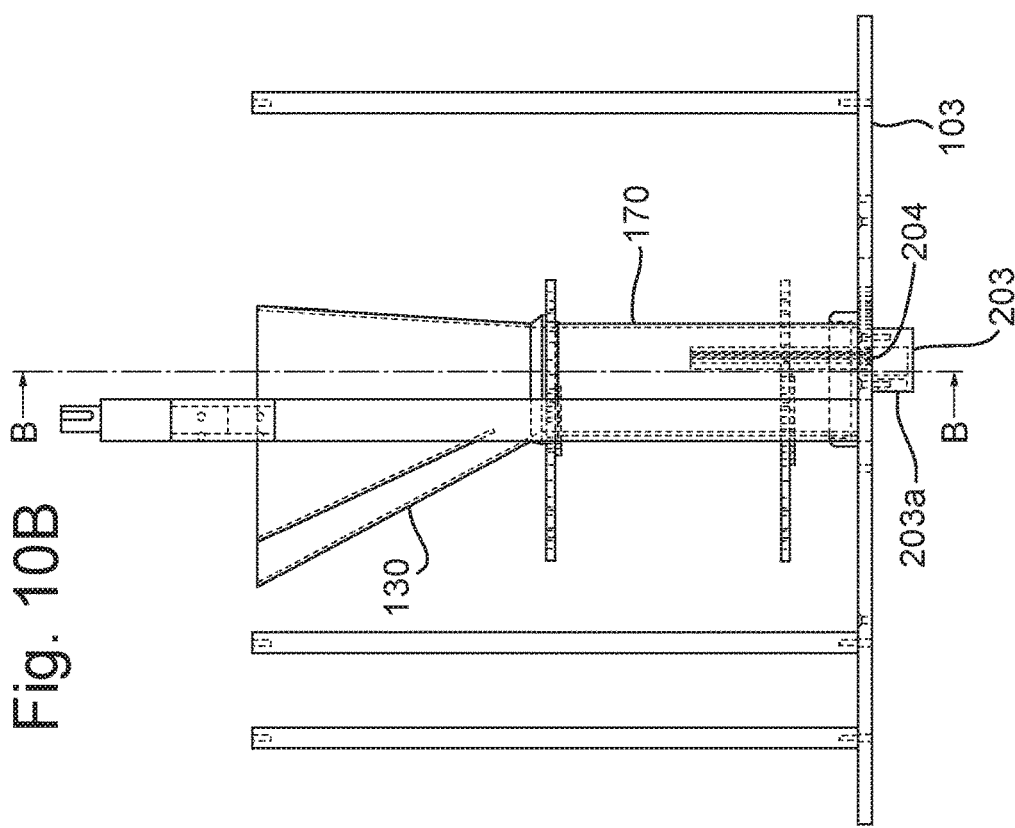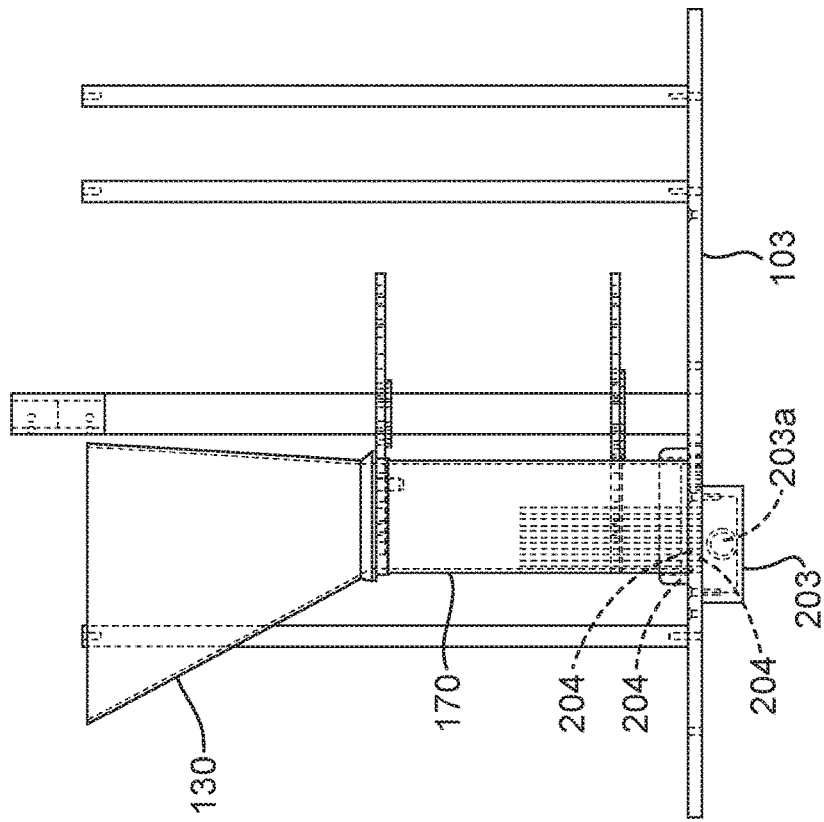

APPARATUS AND METHOD FOR COATING PRODUCT

CROSS-REFERENCE TO RELATED APPLICATIONS

This application is a National Stage filing under 35 U.S.C. § 371 of International Patent Application No. PCT/GB2017/053461, filed Nov. 17, 2017 and entitled "AN APPARATUS AND METHOD FOR COATING PRODUCT," which claims the benefit of priority to GB Application No. 1619581.0, filed Nov. 18, 2016. Both of these applications are incorporated by reference in their entirety herein for all purposes.

FIELD OF THE INVENTION

The present invention is directed to an apparatus and method for coating product in flavouring, and in particular food product such as potato chips or crisps.

DESCRIPTION OF THE RELATED ART

There are many ways known in the art for coating product, such as potato chips, in flavouring, and all have to contend with a number of issues. Firstly, it is important that each batch of product retains as much of the flavouring applied as possible to reduce wastage of flavouring. Secondly it is important that each article in a batch of product is coated, and that the coating of each article is even and over its entire surface. Thirdly, it is desirable to perform the coating of the product in flavouring as quickly as possible to achieve a high throughput of product. Finally, when the type of flavouring used is to be changed, all parts of the apparatus that have been in contact with the flavouring must be removed and cleaned, which is very time consuming and expensive. Typically, products are coated in large batches and then conveyed to packaging equipment where the product is weighed and packed. Coating in this way means that the conveying and weighing equipment become coated in flavouring. This represents a waste of coating material, a potential for cross-contamination, and means that the conveyor and weigher must also be cleaned when the flavouring is changed. To increase efficiency in view of this final problem, systems have been developed to handle larger batches, however this reduces the flexibility of the system and means that excess stock is produced that has to be stored for an extended period of time.

Examples of coating apparatuses known in the art may be found in WO 02/41715 A2 and EP 1424284 A2. The former discloses an apparatus for coating product in flavouring in which product and flavouring are introduced into a rotatable drum, which is rotated to coat the product in the flavouring. The latter discloses an apparatus for coating product in flavouring in which product is moved along a conveyor by a helical blade and flavouring introduced at locations along the conveyor.

It is desirable to produce an apparatus and method for coating product in flavouring which improves the amount of flavouring retained by the product, improves the quality of the coating of flavouring on the product, and reduces the time required to season the product and clean the apparatus over the apparatuses and methods known in the art.

SUMMARY OF INVENTION

In accordance with a first aspect of the present invention, there is provided a blending apparatus for coating product in flavouring comprising: a product dispenser configured to dispense a falling stream of product; a flavouring dispenser configured to dispense a falling stream of flavouring; and a deflection surface, wherein the deflection surface is configured to deflect at least one of the falling stream of product and falling stream of flavouring, thereby bringing the falling stream of product and the falling stream of flavouring together.

It has been found that an apparatus that is configured to bring together falling streams of product and flavouring by deflecting one into the other, preferably while both are still falling, results in a more evenly coated product. Preferably the falling streams of product and flavouring are made to intersect by the deflection of the streams. It has also been found that the amount of flavouring that adheres to the product is more predictable when they are brought together in this way, and this allows product and flavouring to be weighed/measured before being brought together. It also means that the product can be coated as a single portion sized batch and delivered directly into a downstream packaging machine. By weighing the product before it is coated in flavouring, instead of after, and by coating in portion sized batches, the amount of cleaning required when the flavouring is changed is reduced since the weigher does not need to be cleaned, and the amount of conveying apparatus downstream of the blender can be reduced or even eliminated entirely.

The term product is intended to cover any batch of food product made up of a number of discrete pieces, in particular food pieces such as potato chips (or potato crisps), corn chips, or poultry pieces. The term flavouring is intended to cover any material suitable for coating product. In particular, the term covers solid granular flavourings, such as salt or other potato chip flavourings, as well as liquid flavourings such as sauces or marinades. The term blending chute is intended to cover any type of channel or funnel for guiding the falling product and flavouring. Preferably, the deflection surface is configured to deflect the falling stream of product and in some cases it substantially does not deflect the falling stream of flavouring. This is advantageous as, typically, a falling stream of product deflects more favourably than a falling stream of flavouring.

Typically, the product and flavouring will be dispensed such that the falling stream of product and falling stream of flavouring fall along respective paths, with these paths being made to cross or intersect through interaction with the deflection surface. In many cases, these paths, upstream of the deflection surface, have trajectories that would not cross or intersect in the absence of the deflection surface. For example, the falling stream of product and the falling stream of flavouring may fall generally parallel with one another upstream of the deflection surface, or may fall along diverging paths. In some embodiments, the product and flavouring are dispensed vertically, for example by dropping, from the product and flavouring dispensers, thereby simplifying construction.

As mentioned above, the falling streams of product and flavouring are both typically made up of a plurality of discrete product pieces and a plurality of discrete flavouring pieces. Typically, the deflection surface will cause substantially all of the discrete product pieces and/or the plurality of discrete flavouring pieces which interact therewith to change direction. In many cases, the deflection surface will cause a net change in direction of at least one of the falling stream of product and the falling stream of flavouring.

The deflection surface may be in inclined surface, i.e. inclined to the direction in which gravity acts, in which case, configuring the deflection surface to deflect the product and/or flavouring may simply comprise locating the deflection surface such that it intercepts the falling stream of product and/or flavouring. For example, the deflection surface may be located underneath one or both of the product dispenser and the flavouring dispenser, and the product and flavouring dropped onto the deflection surface, in use. Alternatively, the deflection surface may be a substantially vertical surface. If a vertical deflection surface is used, then the product and/or flavouring may be dispensed with trajectories having a horizontal component that causes the product and flavouring to deflect off the deflection surface. Alternatively, or in addition, the vertical deflection surface may be moved into the falling stream of product and/or flavouring in order to cause deflection.

In many embodiments, the apparatus further comprises a blending chute for receiving the dispensed product and flavouring. The blending chute may receive the product after it has been coated in the flavouring, in which case it may be used to direct the flavoured product to additional downstream processing. However, in many cases, at least a portion of the coating process will occur within the blending chute, as will be described below. Typically, the blending chute receives the product and flavouring through an upper opening of the blending chute and preferably the blending chute discharges flavoured product through a lower opening of the blending chute.

The deflection surface may be a discrete part of the apparatus located between the dispensers and the blending chute, or even in the blending chute. However, in particularly preferable embodiments, the deflection surface is a deflection surface of the blending chute. This simplifies construction further and reduces the surface area which requires cleaning between changes of flavouring. For example, in some embodiments, the deflection surface is an inclined surface in the blending chute, and vertically falling product and/or flavouring can be deflected off the inclined surface and into the other of the product and/or flavouring.

In preferable embodiments, the blending chute is movable from a first position, at which it receives the product and flavouring, to a second position. As mentioned above, moving the blending chute after the product and flavouring have been received therein can be used to cause mixing of product or flavouring, i.e. the movement of the blending chute can be an active means of causing deflection of the product and/or flavouring. This agitates the falling streams and may result in better coating of the product in flavouring. In other embodiments, the product and flavouring are brought together by the deflection surface before the blending chute is moved. In these cases, the movement of the blending chute may cause a secondary mixing of the product and flavouring to occur, further improving the quality of the coating achieved. In some embodiments, the blending chute is configured to be moved from the first position towards the second position while the falling stream of product and the falling stream of flavouring fall through the blending chute. Moving the blending chute while the product and flavouring is still falling has been found to achieve a particularly good coating of the product, either where it is providing the primary bringing together of product and flavouring, or where it is providing a secondary mixing, e.g. where be blending chute is moved after the falling stream of product and/or the falling stream of flavouring has been deflected by the deflection surface.

It has also been found that a better coating can be achieved by providing the received product and flavouring with some dwell time in the blending chute, as this allows the flavouring time to adhere to the product. Therefore, preferably the blending chute comprises a closeable opening at a downstream end of the blending chute, the blending chute being configured to hold the received product and flavouring therein before discharging. The closeable opening may be provided by one or more movable gates or doors on the lower end of the blending chute. Alternatively, the blending chute may be provided over a surface which effectively closes the blending chute and configured to move relative to the surface to a position at which it is open. Allowing time for flavouring to adhere means that when the coated product is discharged from the blending chute, e.g. into a downstream packaging machine, it better retains its coating.

In some embodiments, the blending chute is a first blending chute, and the apparatus further comprises a second blending chute; wherein the second blending chute is movable to the first position after the first blending chute is moved away from the first position. The speed at which a blending apparatus with a single blending chute can operate is limited by the time spent by the product and flavouring in the blending chute. A particularly undesirable bottleneck can occur when a long dwell time is desired for the product and flavouring in the blending chute. Providing a second blending chute allows throughput to be increased without having to compromise on the amount of time allowed for the product and flavouring in the first blending chute. This can improve throughout while maintaining coating quality. Particularly preferably, the first and second blending chutes are coupled to one another such that movement of the first blending chute away from the first position causes movement of the second blending chute towards the first position. Such embodiments are particularly advantageous, especially when the movement of the first blending chute is performed while the product and flavouring are falling, as throughput can be increased, with a second blending chute being brought into position for receiving further product and seasoning simultaneously with the departure of the first blending chute.

In embodiments which feature a movable blending chute, preferably the blending chute is configured to discharge the received product and flavouring at a discharge position, the discharge position being laterally offset from the first position. It is preferable to discharge product from the blending chute before it is returned to the first position so that it is not necessary to wait for the blending chute to empty before a starting a second dispense cycle.

Some embodiments further comprise at least a third blending chute, wherein the first, second and third blending chutes are each movable about a closed path sequentially between the first position, the second position and a third position. Three blending chutes further increases throughput, and is particularly advantageous in embodiments in which the product is allowed dwell time in the blending chute. This is because there are three time-limiting phases of the coating process performed by the blending apparatus. These are the initial receipt and blending of the product and flavouring, the dwell time for allowing the coating to adhere, and the discharging of the coated product. Providing at least three blending chutes allows three cycles to be running simultaneously, with minimal idle time for the product and flavouring dispensers. In some embodiments, the first, second and third blending chutes are configured to discharge the received product and flavouring at the third position. That is to say that each blending chute receives product and flavouring at the first position, holds the product at the second position and then discharges at the third position before returning to the first position. While the use of three blending chutes has been found to be particularly advantageous, more blending chutes could also be used. Using more blending chutes could, for example permit additional dwell phases, i.e. positions could be provided between those positions referred to as the 'second' and 'third' at which the product undergoes additional holding or dwell phases. This may further improve the quality of the coating achieved.

In some embodiments, the first blending chute, second blending chute and, if provided, the at least third blending chute are coupled such that they are rotatable about a common axis, wherein rotation of the blending chutes in a first direction moves each of the blending chutes sequentially between the first position, second position, and, if provided, third position. Mounting the blending chutes about a common axis simplifies the construction of an apparatus with multiple blending chutes and allows for them to be moved simultaneously between the various positions, for example by a single driving means.

Preferably, the blending apparatus further comprises a vacuum device configured to generate a negative pressure in the blending chute for drawing product and/or flavouring along the blending chute. Using a vacuum pump to generate negative pressure in the blending chute draws the product and/or flavouring into and along the blending chute and can help minimise the escape and loss of product and/or flavouring from the apparatus. Preferably the vacuum device is in fluid communication with a lower end of the blending chute at a position laterally offset from the first position. The vacuum device may be provided such that is in fluid communication with a lower end of the blending chute prior to its arrival at the first position. This allows one vacuum device to generate negative pressure in multiple blending chutes as they move to the first position. It also allows the vacuum device to generate the negative pressure with a pressure gradient aligned with the direction of travel of the product and flavouring through the blending chute.

In some embodiments, the first blending chute, second blending chute and, if provided, the at least third blending chute are integrally formed. Providing a plurality of blending chutes as a single integrally formed piece simplifies construction, allowing the blending chutes to be formed, for example, as a single 3D printed structure. Further it simplifies the process of disassembly for cleaning between changes of flavouring.

Preferably the flavouring dispenser is located over both an upper opening and a lower opening of the blending chute. Flavouring does not typically interact well with an inclined surface, and it is therefore preferable to allow the flavouring to fall unobstructed through the blending chute and to encourage the product to travel through the falling flavouring.

Timing the dispensing of product and flavouring such that they are brought together at the optimum moment may require very precise control. Therefore, in many embodiments, a controller is provided for controlling the relative times at which the product dispenser and flavouring dispenser dispense product and flavouring. This can ensure that the coating is performed substantially the same in subsequent cycles.

Some embodiments further comprise a second deflection surface located downstream of the first deflection surface, the second deflection surface being configured to interact with at least one of the falling stream of product and falling stream of flavouring. Preferably the second deflection surface is provided at an angle to the direction in which gravity acts in use. The second deflection surface may be provided by a surface of the blending chute, and in particular by a curved surface of the blending chute such as a curved channel of the blending chute for guiding product and flavouring to a lower opening of the blending chute. Such a curved channel may be provided by providing a lower opening of the channel laterally offset from an upper opening of the channel. A second deflection surface has been found to further agitate falling product and flavouring and improve the coating achieved.

Preferably, movement of the blending chute from the first position to the second position moves at least one of the first deflection surface and the second deflection surface into the falling stream of product and/or the falling stream of flavouring, thereby contributing to the first or second deflection of the falling stream of product and/or the falling stream of flavouring.

Typically, the product dispenser dispenses product at a product dispense position and the flavouring dispenser dispenses product at a flavouring dispense position, wherein the product dispense position and the flavouring dispense position are laterally offset from one another. As a result, the falling streams of product and flavouring will be laterally offset from one another prior to interaction with the deflection surface. This lateral offset will typically comprise apertures, e.g. circular apertures, laterally spaced from one another. However, in alternative embodiments, the product dispenser dispenses product through a product dispense opening and the flavouring dispenser dispenses flavouring through a flavouring dispense opening, wherein one of the product dispense opening and the flavouring dispense opening substantially surrounds the other of the product dispense opening and the flavouring dispense opening, e.g. so one of the falling stream of product and falling stream of flavouring falls coaxially within, but still laterally offset from, the other of the falling stream of product and falling stream of flavouring.

According to a second aspect of the invention, there is provided a method for coating product in flavouring, comprising the steps: dispensing a falling stream of product from a product dispenser; dispensing a falling stream of flavouring from a flavouring dispenser; deflecting the falling stream of product and the falling stream of flavouring using a deflection surface so as to bring the falling stream of product and the falling stream of flavouring together, thereby coating the product in the flavouring.

This method of coating product in flavouring is suitable for implementation using a blending apparatus according to the first aspect. The method provides the same advantages as the apparatus according to the first aspect of the invention.

Preferably the method comprises receiving the dispensed product and flavouring in a blending chute.

Preferably the method comprises arranging a deflection surface such that at least one of the falling stream of product and falling stream of flavouring interacts with the deflection surface such that it changes direction while falling. Further preferably, the deflection surface is a deflection surface of the blending chute.

In many embodiments, at least one of dispensing product and dispensing flavouring comprises allowing the product/flavouring to fall under gravity. Dispensing product by allowing it to fall under gravity makes the process very repeatable and consistent, and simplifies the execution of the method.

Some embodiments of the method further comprise moving the blending chute from a first position, at which it receives the product and flavouring, to a second position (after the product and flavouring have been received in the blending chute). In some embodiments, this comprises moving the blending chute from the first position towards the second position while the falling stream of product and the falling stream of flavouring fall through the blending chute.

Preferably the method further comprises holding the received product and flavouring in the blending chute before discharging the received product and flavouring.

In some embodiments, the blending chute is a first blending chute, and the method further comprises moving a second blending chute to the first position after moving the first blending chute away from the first position; and subsequently dispensing product so as to generate a falling stream of product; dispensing flavouring so as to generate a falling stream of flavouring; deflecting the falling stream of product and the falling stream of flavouring using a deflection surface so as to bring the falling stream of product and the falling stream of flavouring together, thereby coating the product in the flavouring; and receiving the dispensed product and flavouring in the second blending chute. Preferably these embodiments comprise moving the first blending chute away from the first position while the falling stream of product and the falling stream of flavouring fall through the first blending chute and simultaneously moving the second blending chute toward the first position.

Preferably the method comprises discharging the received product and flavouring at a discharge position, the discharge position being laterally offset from the first position.

In some embodiments, the method comprises moving each of the first blending chute, the second blending chute and a third blending chute about a closed path sequentially between the first position, the second position and a third position; and further comprising, after arrival of the third blending chute at the first position, dispensing product so as to generate a falling stream of product; dispensing flavouring so as to generate a falling stream of flavouring; deflecting the falling stream of product and the falling stream of flavouring using a deflection surface so as to bring the falling stream of product and the falling stream of flavouring together, thereby coating the product in the flavouring; and receiving the dispensed product and flavouring in the third blending chute. Preferably these embodiments comprise discharging the received product and flavouring from the first blending chute at the third position; discharging the received product and flavouring from the second blending chute at the third position; and discharging the received product and flavouring from the third blending chute at the third position.

Preferably the method comprises generating a negative pressure in the blending chute for drawing product and/or flavouring along the blending chute. In some embodiments this comprises generating a negative pressure in the blending chute prior to its arrival at the first position.

BRIEF DESCRIPTION OF THE DRAWINGS

Some examples of apparatuses and methods for coating product according to the invention will now be described with reference to the accompanying drawings, in which:

FIGS. 10A to 10C show a partial blending apparatus for coating product in flavouring according to a fourth embodiment in first and second schematic side views and a schematic cross-section respectively.

DETAILED DESCRIPTION

Figure 1:
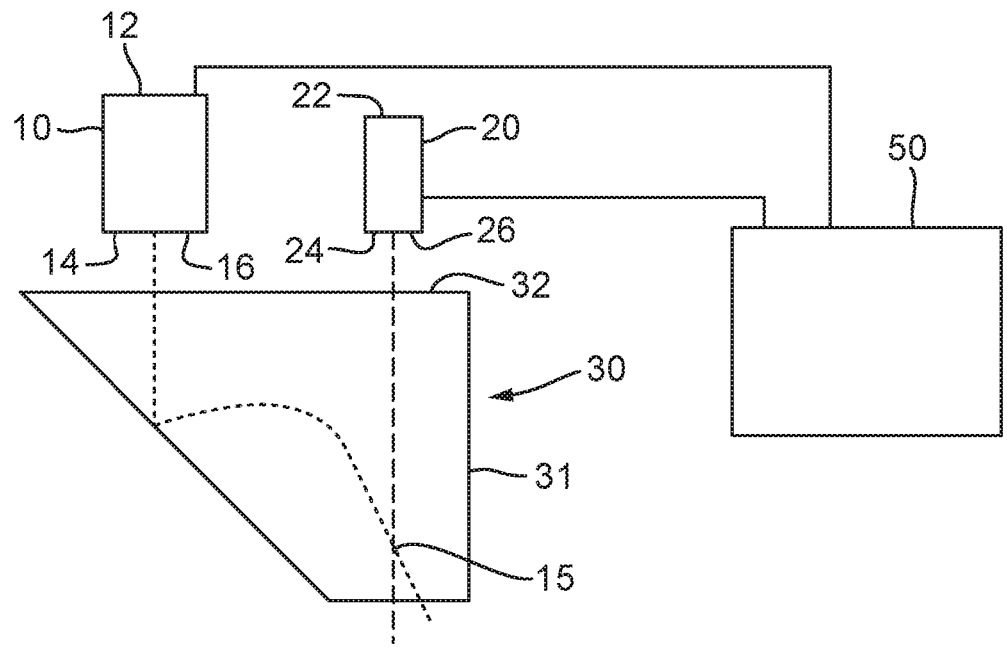
FIG. 1 is a schematic view of a blending apparatus for coating product in flavouring according to a first embodiment.
Figure 2:
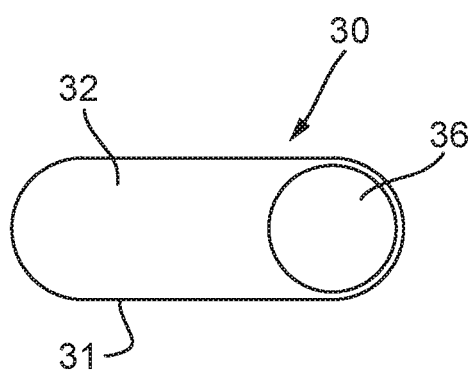
FIG. 2 is a plan view of a blending chute used in the first embodiment.

The blending apparatus for coating product shown in FIGS. 1 and 2 will now be described in detail. The apparatus has a product dispenser in the form of product hopper 10, a flavouring dispenser in the form of flavouring hopper 20, a blending chute 30, and a controller 50. The product hopper and flavouring hopper are mounted above the blending chute by means not shown, and are both operably connected to the controller 50.

The product hopper 10 receives a batch of product through an upper opening 12 from an upstream product weigher (not shown). An example of a batch of product suitable for use in this embodiment is a batch of potato chips. A typical batch of potato chips suitable for use in this embodiment weighs between 5 g and 300 g, although smaller or larger batches could also be used. The product hopper holds the product until a signal from the controller 50 operates the product hopper door 14 and allows the batch of product to fall under gravity through the product hopper lower opening 16 into the blending chute 30. In this embodiment, the product hopper 10 is an upright cylinder, which has upper and lower openings 12, 16 that are circular to encourage product to fall generally along the axis of the hopper into blending chute 30. While a product hopper is described with respect to this embodiment, other forms of product dispenser could be used.

The flavouring hopper 20 receives a batch of flavouring through an upper opening 22 from an upstream flavouring weigher (not shown). A batch of flavouring typically comprises a number of small granular particles, although other flavourings, such as liquid flavourings could be used. The flavouring is held in the flavouring hopper 20 until a signal from the controller 50 operates the flavouring hopper door 24, at which point the flavouring falls through the lower flavouring hopper opening 26 and into the blending chute 30. In this embodiment, the flavouring hopper 20 is an upright cylinder, narrower in diameter than the product hopper 10, and has upper and lower openings 22, 26 that are circular so that the flavouring falls into the blending chute 30 closely aligned with the axis of the flavouring hopper 20. While a flavouring hopper is described with respect to this embodiment, other forms of flavouring dispenser could be used, in particular, a volumetric seasoning dispenser, or a liquid seasoning dispenser.

The product hopper 10 and flavouring hopper 20 are laterally offset from one another, and positioned with their axes vertical such that their lower openings 16, 26 are at substantially the same height. While the openings are at substantially the same height in this embodiment, this is not essential, and the heights may be configured to achieve a desired fall characteristics for a particular product or flavouring. For example, for granular flavourings, it may be preferable to mount the flavouring dispenser higher than the product dispenser so that the stream of flavouring is more spread out by the time the product and flavouring are brought together. The lateral offset of the product hopper 10 and flavouring hopper 20 means that when the batches of product and flavouring are discharged, they will fall generally parallel with each other into the blending chute.

The blending chute 30, which receives the discharged product and flavouring, is configured to bring the product and flavouring together to coat the product. The blending chute has an upper opening 32 located just below the lower openings 16, 26 of the product hopper 10 and flavouring hopper 20. The blending chute upper opening 32, in plan view, is an elongated circle, described by two straight parallel lines connecting respective ends of two semicircles. The blending chute upper opening extends such that it encompasses both the lower openings 16, 26 of the product hopper 10 and flavouring hopper 20 within its perimeter. The axes of the product hopper 10 and flavouring hopper 20 are located offset from each other along the length of the blending chute upper opening. The blending chute lower opening 36, in plan view, is circular, and is substantially aligned with the axis of the flavouring hopper 20. A blending chute wall 31 extends between the upper and lower blending chute openings and around the entire perimeter of both the upper and lower blending chute openings 32, 36. The blending chute wall 31 thereby has a semi-cylindrical portion that extends vertically from a first side of the elongate upper opening 32, proximate the flavouring hopper 20, to a first side of the circular lower opening 36, and a sloping portion, which acts as a deflection surface, that extends from a second side of the elongate upper opening 32, proximate the product hopper 10, to a second side of the circular lower opening 36, passing at an oblique angle through the axis of the product hopper 10.

The controller 50 is connected to both the flavouring hopper 20 and the product hopper 10 and configured to send signals to the flavouring hopper 20 and product hopper 10 activating the respective hopper doors 24, 14.

When the flavouring hopper 20 receives a signal from the controller 50, and the flavouring hopper door 24 opens, the flavouring falls into the blending chute generally along the axis of the flavouring hopper. The shaping of the blending chute means that the flavouring falls unobstructed through the blending chute 30 to the lower opening 36 along a substantially vertical flavouring path. As the flavouring is dispensed from the flavouring hopper, it spreads out, forming a stream of flavouring which travels along the flavouring path.

When the product hopper 10 receives a signal from the controller 50 and the product hopper door 14 opens the batch of product falls into the blending chute, generally along the axis of the product hopper 10. The shape of the blending chute means that the stream of product that leaves the product hopper will fall into the sloped section of the blending chute wall 31, which will deflect the product, changing its direction of travel such that it follows an arced path towards the lower opening 36 of the blending chute 30. The path that the product takes through the blending chute 30, which includes the vertical portion before contact with the blending chute wall 31 and the arced portion after contact with the blending chute wall, will be referred to as the product path. At some point, above the lower opening 36, the arced portion of the product path intersects the flavouring path at an oblique angle. The point at which the paths intersect will be referred to as the coating location 15. Similarly to the flavouring, the batch of product will spread out as it is dispensed from the product hopper to form a stream of product. The angle at which the product path passes through the coating location will be affected by a number of factors, including the type of product used, and the dimensions of the blending chute.

A high quality coating can be obtained by using the controller to precisely control the timing of activation of the product hopper and flavouring hopper doors 14, 24, such that the batch of product passes through the coating location in time with the stream of flavouring. Flavoured product will then pass through the lower opening 36 of the blending chute 30 for downstream processing. The timing for a run of a particular product and flavouring can be set by manually adjusting the timings used by the controller by analysing the results of a previous run and entering adjustments using a controller interface (not shown).

An Alternative apparatus for bringing product and flavouring together will now be described with reference to FIG. 3.

Figure 3:
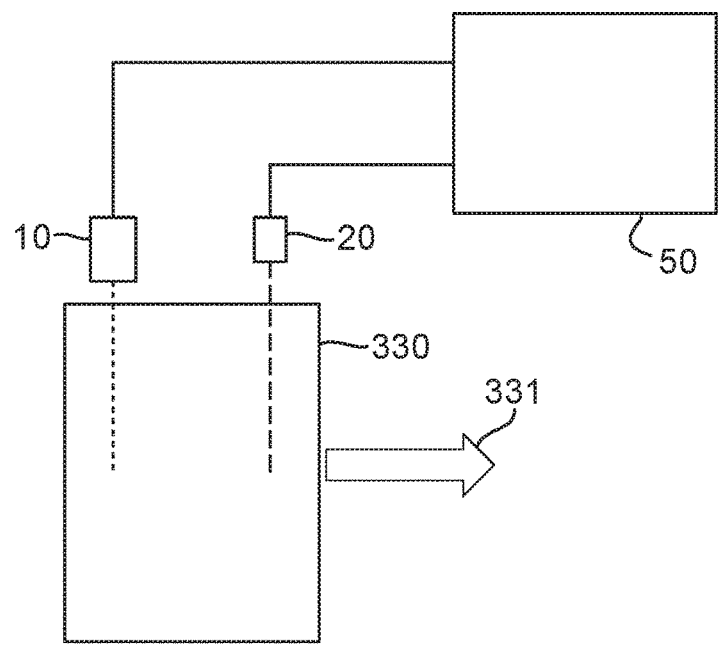
FIG. 3 is a schematic view of a blending apparatus for coating product in flavouring according to a second embodiment.
Figure 4:
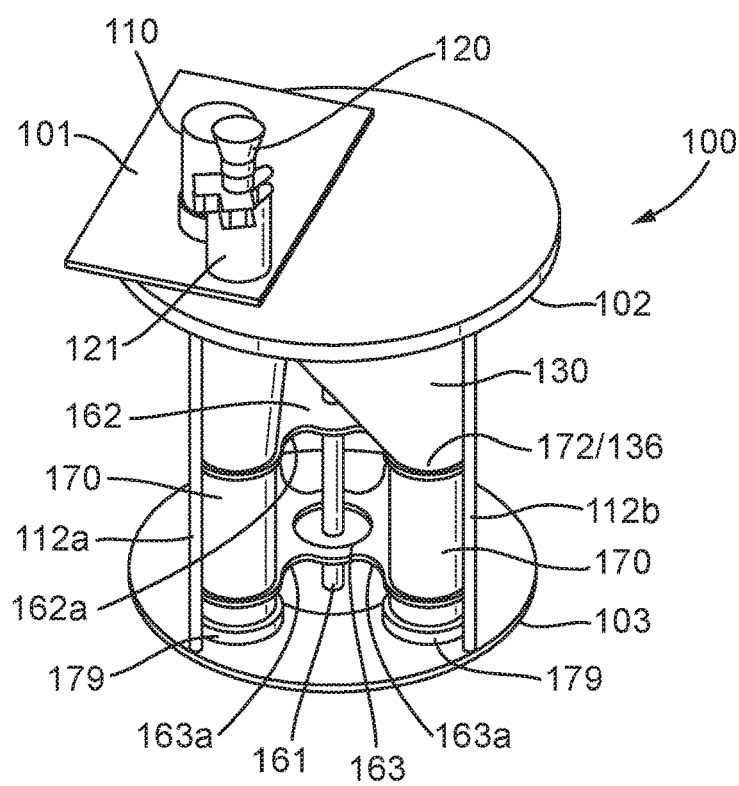
FIG. 4 is a perspective view of an apparatus for coating product according to a third embodiment.
Figure 5A:
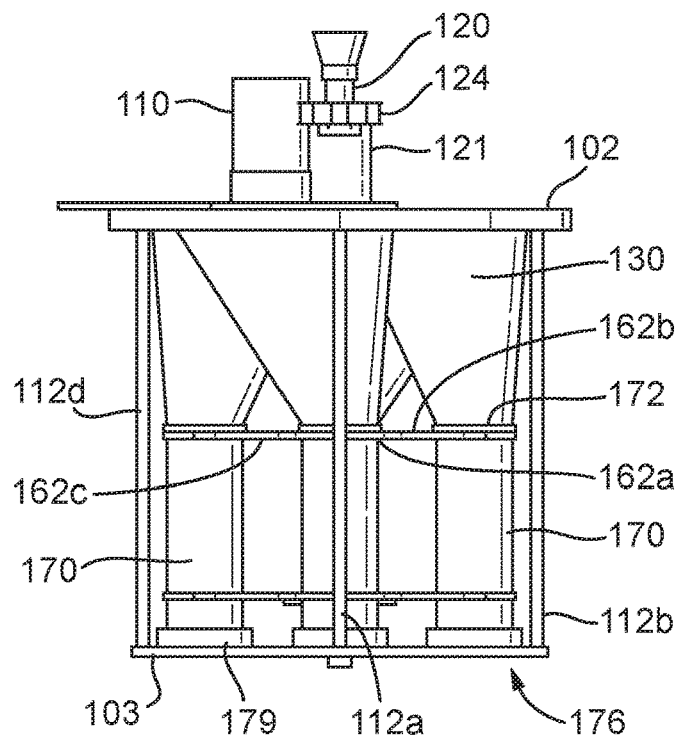
FIGS. 5A and 5B are front and side views respectively of the apparatus for coating product according to the third embodiment.
Figure 5B:
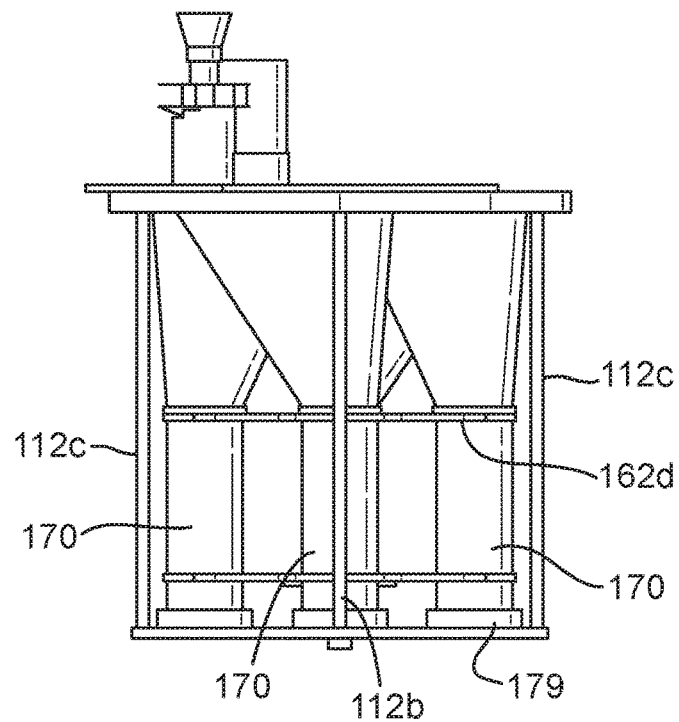
Figure 6:
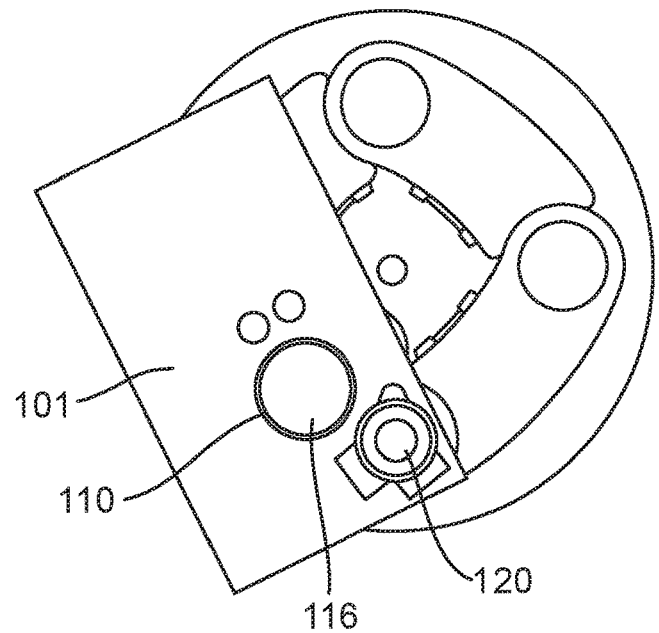
FIG. 6 is a top view of the apparatus for coating product according to the third embodiment with the large circular plate omitted to reveal the components below.
Figure 7:
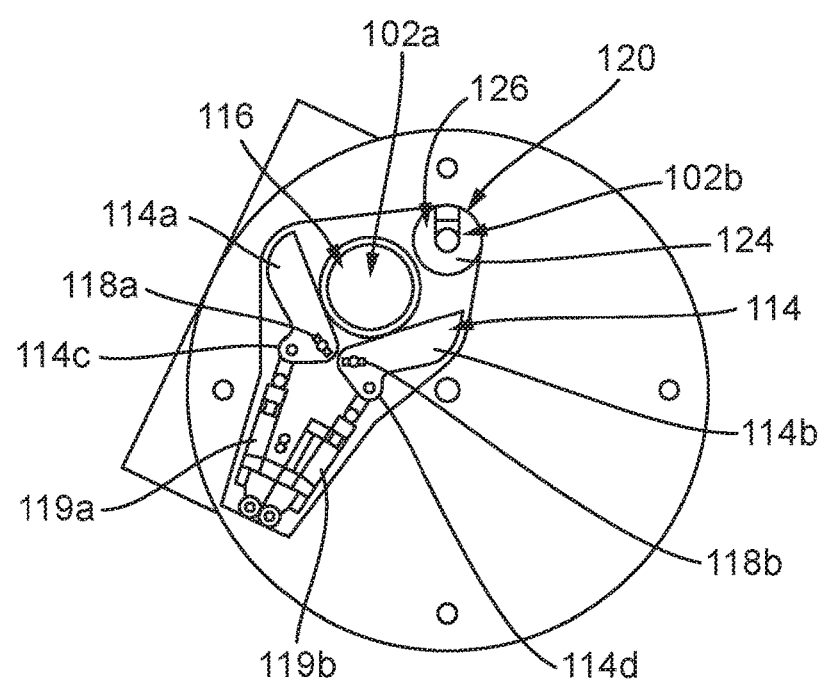
FIG. 7 is a bottom partial section view of the large circular plate used in the third embodiment.

FIG. 3 shows a second embodiment of a blending apparatus which comprises a product dispenser in the form of product hopper 10, a flavouring dispenser in the form of flavouring hopper 20, a blending chute 330, and a controller 50. The product hopper and flavouring hopper are mounted above the blending chute by means not shown, are both operably connected to the controller 50, and operate substantially as described in the first embodiment. In this embodiment, the blending chute 330 is a cylindrical chute which is movably mounted beneath the product and flavouring hoppers. Product and flavouring are discharged such that they fall vertically into the blending chute. Once the product and flavouring are received in the blending chute 330, and while the product and flavouring are still falling, the blending chute is moved horizontally, in the direction indicated by arrow 331 in FIG. 3, so as to bring the product and flavouring together to cause mixing. In some embodiments, the blending chute 330 may have a door closing its lower opening for retaining the product and flavouring therein after they are brought together and until the blending chute is located at a desired discharge position.

The apparatus shown in FIGS. 4 to 7 will now be described in detail. This third embodiment of the invention uses the same principle for coating product as the first embodiment, and includes a number of particularly preferable features.

The apparatus 100 includes a product dispenser in the form of product hopper 110, and a flavouring dispenser in the form of flavouring hopper 120, mounted laterally offset from each other on an upper surface of a horizontal rectangular plate 101. The product hopper 110 is cylindrical, and features a lower opening 116, which aligns with a corresponding opening through the rectangular plate 101. The flavouring hopper 120 is also cylindrical, and is narrower than the product hopper 110. The flavouring hopper comprises a circular lower opening 126 which aligns with a top opening of a cylindrical tubular member 121 mounted below the flavouring hopper 120, which acts to vertically space the lower opening of the flavouring hopper 120 from the lower opening of the product hopper 110. The bottom opening of the cylindrical tubular member 121 is fixedly connected to the upper surface of the rectangular plate, and positioned such that it aligns with a corresponding opening through the rectangular plate 101.

A flavouring hopper door 124 closes the flavouring hopper lower opening 126 at the boundary between the flavouring hopper and the cylindrical tubular member 121.

The rectangular plate 101 is mounted on a large circular plate 102, off-centre, such that the axes of the product and flavouring hopper 110, 120 are over the centre of the chutes below, which in this case is approximately halfway from the centre of the circular plate to the perimeter. The lower opening 116 of the product hopper 110, and corresponding opening through the rectangular plate, aligns with a further opening 102a through the large circular plate 102. Similarly, the lower opening of the cylindrical tubular member 121, and corresponding opening through the rectangular plate, aligns with a further opening 102b through the large circular plate 102.

Product is retained in the product hopper 110 by a product hopper door 114 mounted inside of the large circular plate 102, and configured to close the lower opening 116 of the hopper and prevent product from passing through the opening through the large circular plate. The product hopper door comprises two arm plates 114a, 114b, which, in a closed position close the opening 102a through the large circular plate 102, the two arm plates in a closed position are slightly larger than the opening which they close. Each plate is connected by a respective hinge 118a, 118b through a distal end of the arm plate to the large circular plate 102. The hinges connect through respective ends of the arm plates on the same side of the opening so that the plates open in a scissor-like manner. Each arm plate 114a, 114b further has a nose portion 114c, 114d, which extends away from the location of the hinge in a direction in the plane of the arm plate. A distal end of each nose portion 114c, 114d, is connected via a respective pivot 118c, 118d, to a respective piston 119a, 119b, also inside the large circular plate 102. The actuation of the piston acts in the plane of the arm plates to rotate the arm plates about pivots 118a, 118b to open and close the product hopper door 114 in the scissor-like manner.

Four bars 112a, 112b, 112c, 112d, spaced at 90° intervals around the perimeter of the lower side of the large circular plate 102, extend from the lower side of the circular plate to an upper surface of an annulus-shaped plate 103 below. The annulus plate 103 is mounted coaxially with the circular plate 102, and has an outer circumference substantially the same as the circumference of the large circular plate 102.

A central bar 161 is rotatably mounted to the underside of the large circular plate 102 by upper and lower bearings (not shown). The central bar is located along the central axis between the circular plate 102 and annulus plate 103, and extends from the opening of the annulus plate 103 to the underside of the circular plate 102. The central bar is rotated by a motor (not shown) below the annulus plate. Mounted on the central bar are upper and lower holding members 162, 163. The upper holding member comprises four holding arms 162a, 162b, 162c, 162d which extend radially outward from the central bar 161 at 90° intervals around the central bar. Each holding arm 162a, 162b, 1622c, 162d has a substantially half-annulus shaped portion at its distal end. The lower holding member 163 is identical to the upper holding member 162 and identically aligned, such that each pair of holding arms 162a, 163a is suitable for holding a vertically aligned cylinder at an upper and lower location.

Each pair of holding arms 162a, 163a; 162b, 163b; 162c, 163c; 162d, 163d removably holds a respective cylindrical blending chute lower portion 170, with the half-annulus portion of each holding arm slotting into a respective groove about the circumference of the cylindrical blending chute lower portion. Each blending chute lower portion 170 is a hollow cylindrical member, with an upper opening 172 and a lower opening 176. Each upper arm 162a, 162b, 162c, 162d holds a respective blending chute lower portion proximate its upper opening 172, at approximately a halfway point between the large circular plate 102 and the annulus plate 103. Each lower holding arm 163a, 163b, 163c, 163d holds the respective blending chute lower portion 170 proximate its lower opening 176 close to the annulus-shaped plate 103. The lower opening 176 of each blending chute lower portion sits in a sliding ring 179. The sliding ring contacts the upper surface of the annulus plate 103, and extends about the circumference of the lower opening 176 of the blending chute lower portion to form a movable seal between the lower opening of the blending chute lower portion and the annulus plate 103.

In this embodiment, each of the four blending chute lower portions 170 is integrally formed with a respective blending chute upper portion 130. The blending chute, comprising the upper and lower portions 130, 170, may be formed, for example, by 3D printing as a single integral structure. The blending chute upper portion 130 has a lower opening 136, which is the upper opening 172 of the blending chute lower portion, and an upper opening 132 proximate the lower side of the large circular plate. In this embodiment, the upper opening 132 of each blending chute upper portion, in plan view, is similar to the first embodiment, but is slightly curved along the longitudinal axis of the upper opening to better follow the circular perimeter of the large circular plate. Furthermore, the end of the upper opening closest to the product hopper 110 axis is shaped to conform to the adjacent blending chute upper portion so that they may be positioned closely together. While the shape of the upper opening 132 of the blending chute upper portion 130 is slightly different, it retains the function of the blending chute of the first embodiment, namely a semi-cylindrical portion which allows flavouring to be dropped straight through the blending chute 130 towards the lower opening 136, and a sloped wall, at an oblique angle to the axis of the product hopper, which causes product to deflect towards the falling flavouring and towards the lower opening.

An alternative blending chute construction is shown in FIGS. 9A to 9D. The lower opening 176 of each blending chute lower portion is closed by a respective gate 180, as shown in FIGS. 9A to 9D. These gates may be used in place of the sliding rings 179 discussed above. Each gate is substantially circular when closed to match the lower opening of the blending chute lower portion 170, and comprises two halves 180a, 180b. Each half 180a, 180b is connected to a collar of the lower opening by a respective hinge 181a, 181b. The gate 180 is opened by causing the gate halves 180a, 180b to turn about their respective hinges 181a, 181b (by means not shown in FIGS. 9A to 9D), resulting in the gate 180 opening in a scissor-like manner. The gate halves may be opened and closed by a number of means, such as pneumatic actuators provided on each blending chute and coupled to the gate halves, or preferably by a static cam actuator located at the discharge position and configured to operate the gate of whichever blending chute is located at the discharge position. The blending chute of FIGS. 9A to 9D also features a blending chute lower portion 170 in which the lower opening 176 is laterally offset from the upper opening 172 to introduce a bend into the cylindrical blending chute lower portion 170 and provide a second deflection surface. This bend in the blending chute can cause improved mixing of the product and flavouring as they pass through the blending chute lower portion 170.

Figure 8:
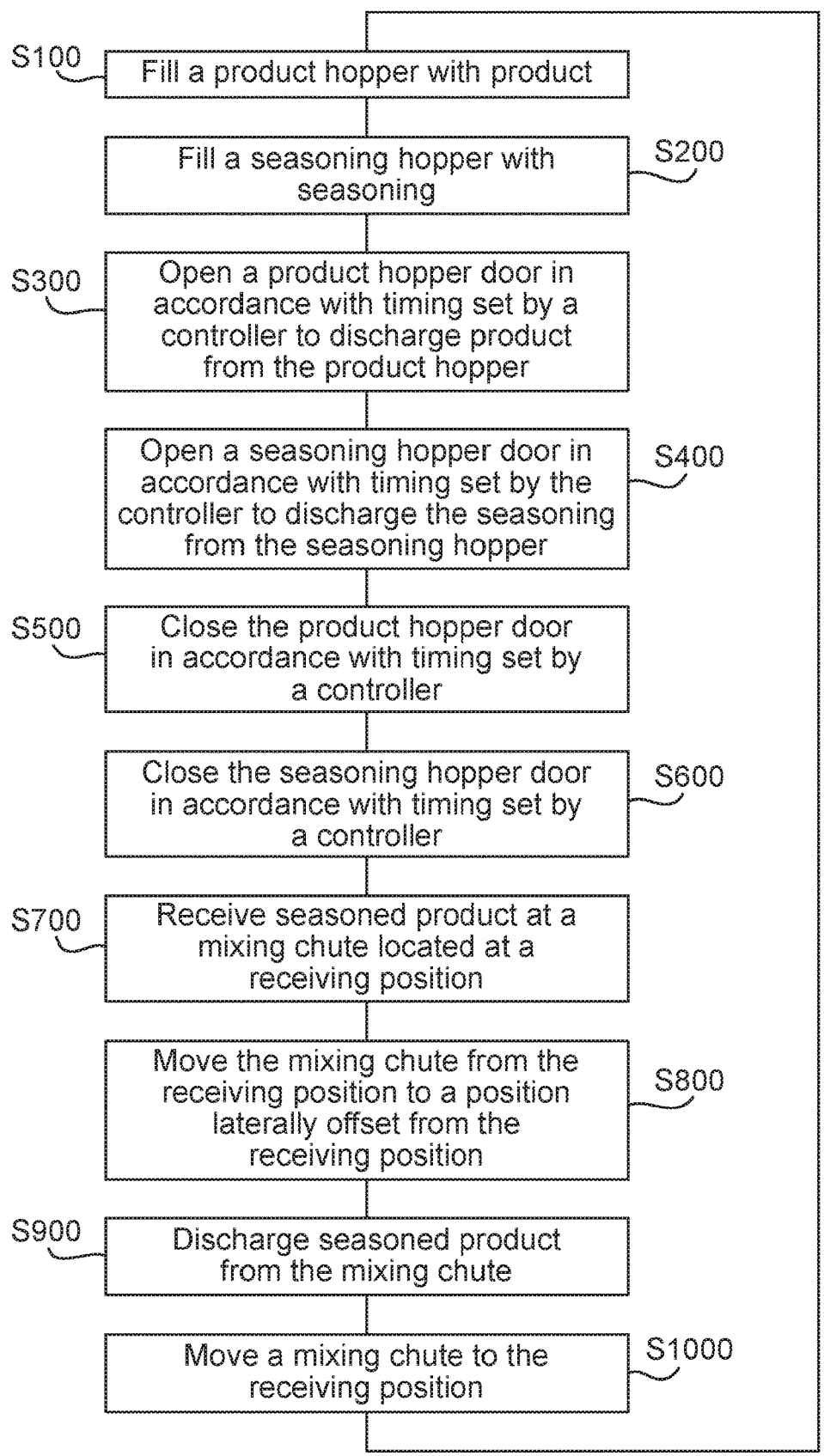
FIG. 8 is a flow diagram of steps for coating a product in coating.
Figure 9A:
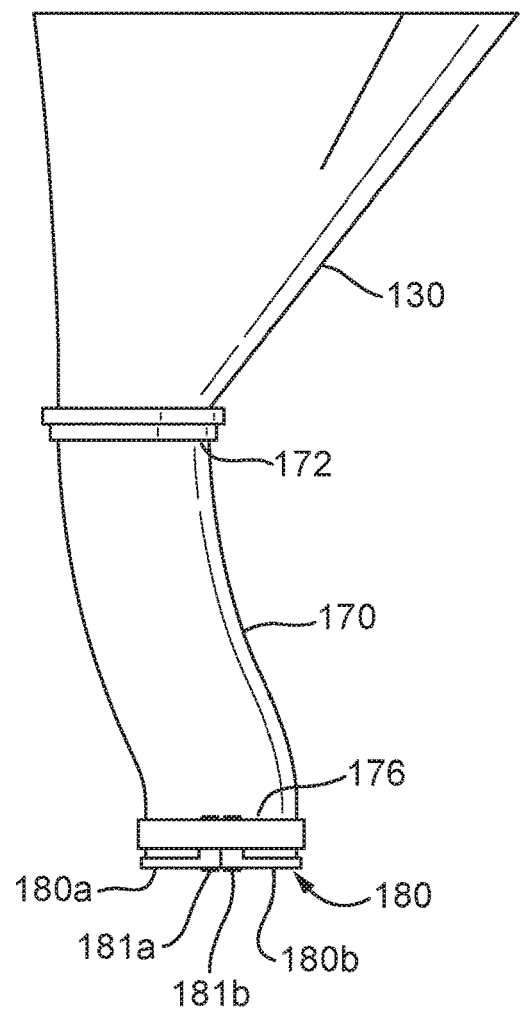
FIGS. 9A to 9D show an alternative blending chute construction in side view, top view, and top and bottom perspective views respectively.
Figure 9B:
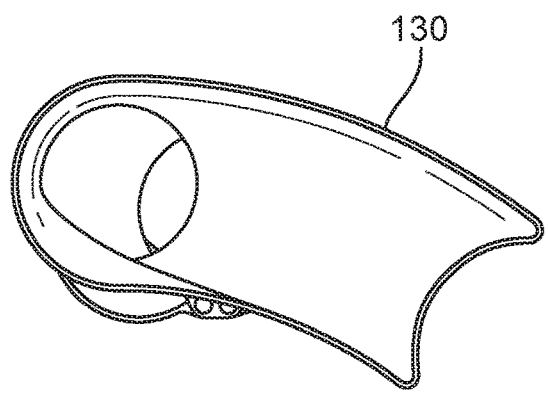
Figure 9C:
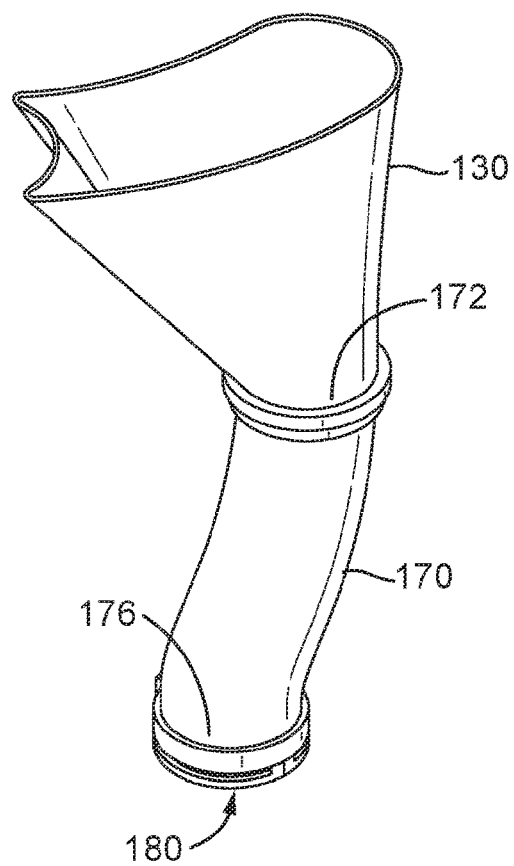
Figure 9D:
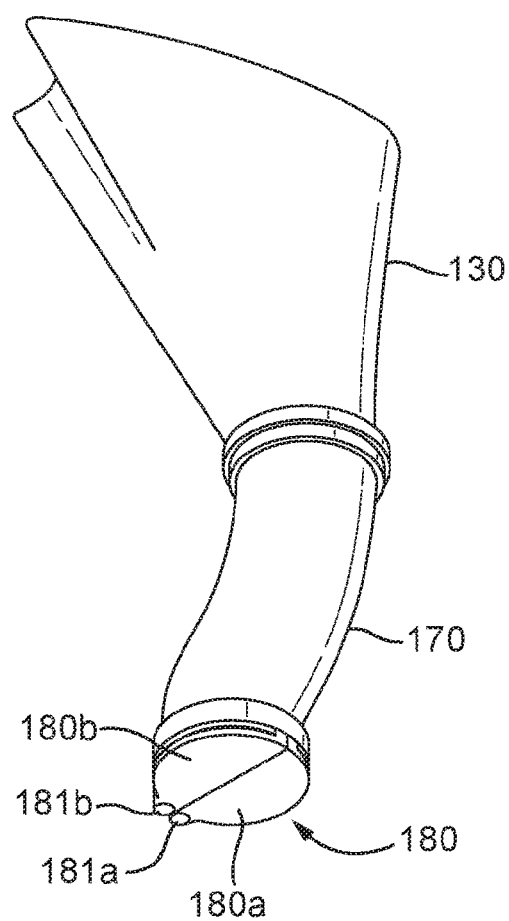

Operation of the apparatus shown in FIGS. 3 to 7 will now be described with reference to the flow diagram of FIG. 8. It will be appreciated that the below described order of execution of steps is only one possible order in which the steps may be carried out and that other orders are possible. Further, it will be appreciated that while steps are described as happening one after the other, the execution of one or more steps may occur simultaneously or overlap with the execution of one or more other steps.

The flow diagram begins with the apparatus in a starting configuration. In a starting configuration, a first blending chute, comprised of the blending chute upper portion 130 and blending chute lower portion 170 is positioned below the product hopper 110 and flavouring hopper 120. The blending chute is aligned such that the axis of the flavouring hopper passes approximately through the centre of the lower opening 136, and hence approximately along the axis of the blending chute lower portion 170, the blending chute lower portion being in a receiving position. In this position, the axis of the product hopper 110 passes through the sloped wall of the blending chute upper portion 130. Product and flavouring are received in the product and flavouring hoppers 110, 120 respectively in steps S100 and S200. In steps S300 and S400, the controller (not shown) operates the product and flavouring hopper doors 114, 124, opening them to discharge the product and flavouring, with the timing between the opening of the product hopper door 114 and the flavouring hopper door 124 having been predetermined through trial and error. After another predetermined time, set based on the length of time required for product and flavouring to completely leave their respective hoppers 110, 120, the controller closes the product hopper door 114 and the flavouring hopper door 124 in steps S500 and S600. While the hopper doors are being closed, the discharged flavouring forms a stream that travels along the flavouring path, straight down towards the lower opening 136 of the blending chute 130. Meanwhile, the product deflects off the sloped portion of the blending chute and intersects the stream of flavouring as it travels to the lower opening of the blending chute upper portion, and is thereby flavoured. The flavoured product is received in the blending chute lower portion 170 at the receiving position in step S700. The product sits on the annulus plate 103 at the lower end of the blending chute lower portion, and is retained in the blending chute lower portion by the sliding ring 179, which forms a sliding seal between the lower opening and the annulus plate.

The central bar 161 is made to rotate through 90°. The central bar may be made to rotate after the product has settled at the end of the blending chute lower portion 170, however for maximum throughput the central bar 161 should be made to rotate as soon as product has left the blending chute upper portion 130 and entered the blending chute lower portion 170. The rotation of the central bar causes the blending chute to rotate about central bar 161, thereby moving the blending chute lower portion containing flavoured product away from the receiving position in step S800, and moving an empty blending chute 130 into position, ready for a second batch of product. Advantageously, the rotation of the blending chute agitates the contents of the blending chute lower portion to further coat the product in flavouring. While the second blending chute receives flavoured product, the first blending chute holds the product, and allows the flavouring to adhere. When another batch of flavoured product is received in the second blending chute, the central bar rotates again, rotating the first blending chute such that it is over a discharge opening 103a in the annulus plate 103 at a discharge position. In the discharge position, the flavoured product falls through the opening 103a and is discharged in a step S900, for downstream processing using, for example, a packaging machine or conveyor. The discharge opening 103a is approximately the same diameter as the blending chute lower portion, so that all product is quickly discharged from the blending chute lower portion, but is slightly smaller in diameter than the sliding ring 179, so that the sliding ring is retained on the end of the blending chute lower portion 170.

Figure 10C:
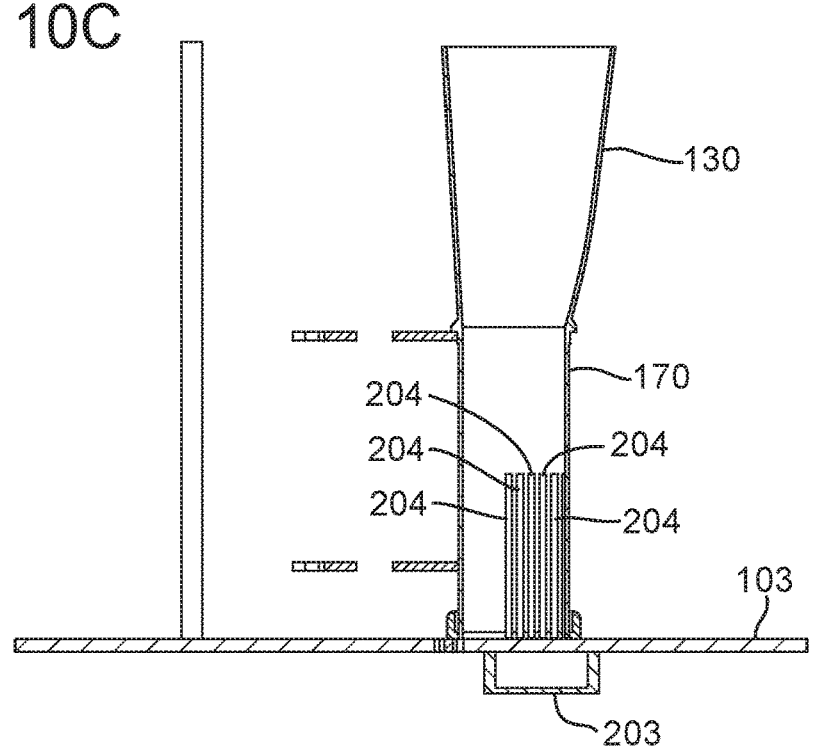
Figure 11A:
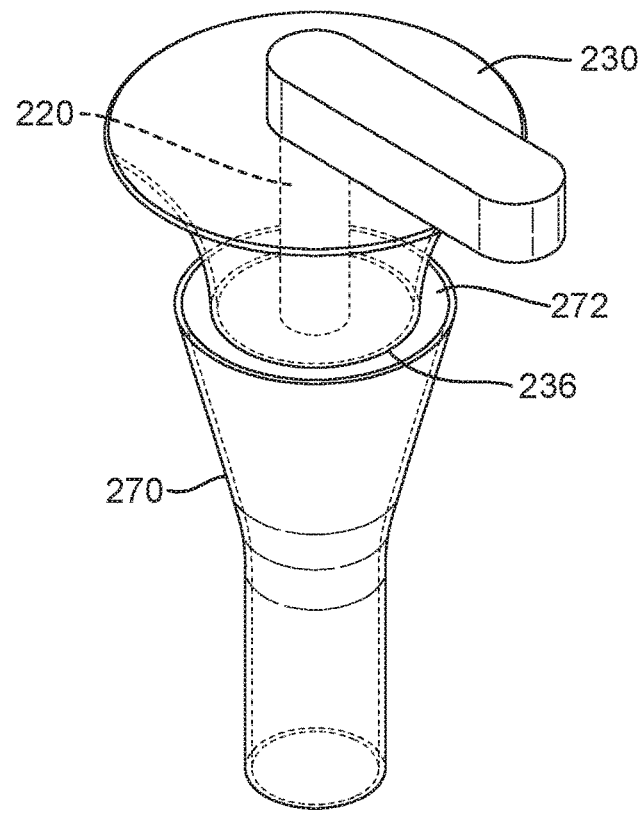
FIGS. 11A to 11D show a part of a blending apparatus for coating product in flavouring according to a fifth embodiment in perspective, top, first side and cross-sectional views respectively.
Figure 11B:
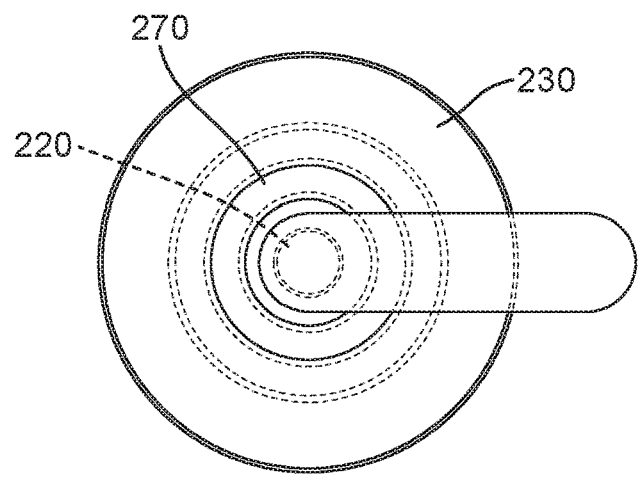
Figure 11C:
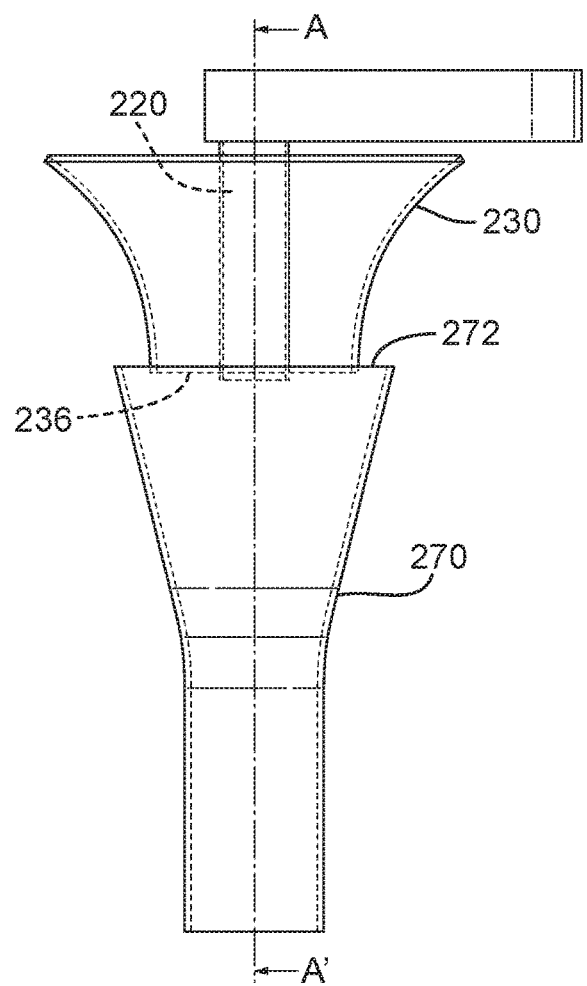
Figure 11D:
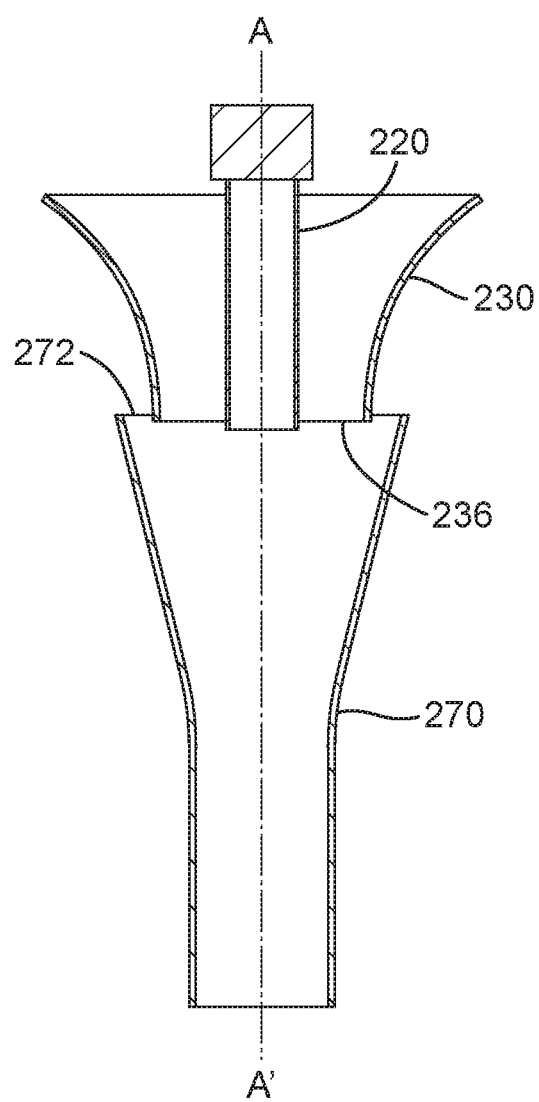

The now empty blending chute 130, 170 is rotated again, away from the discharge position, after another flavoured batch is received at the receiving position, so that it is now only one more turn away from being back at the receiving position. When the next batch of flavoured product is received in the blending chute located at the receiving position, the central bar 161 is rotated again, and the empty blending chute is then moved towards the receiving position in step S1000, so that the process my start again. As the blending chute is moved towards the receiving position in step S1000, the blending chute travels over a vacuum system in the annulus-shaped plate 103, for generating a negative pressure in the blending chute. The vacuum system will be described with reference to FIGS. 10A to 10C. A vacuum manifold 203 in the form of a cuboidal box is provided on the lower surface of the annulus plate 103. The vacuum manifold has in a side surface, an opening 203a for connecting via a vacuum conduit (not shown) to a vacuum pump (not show). The vacuum manifold 203 communicates with a plurality of vacuum openings 204 through the annulus-shaped plate. In FIGS. 10A to 10C, the openings are identified by a number of cylinders extending into the blending chute. It will be appreciated that this extended representation merely clarifies the positioning of the vacuum openings 204, and in practice, the vacuum openings 204 are provided only as holes through the annulus-shaped plate 103 and do not extend beyond the upper surface of the plate. A plurality of small holes is advantageous as it prevents large debris being drawn into the vacuum system and causing damage. However, in alternative embodiments, the vacuum opening may be a single substantially crescent shaped opening. The vacuum openings 204 are laterally offset from the receiving position, so that they communicate with the blending chute lower portion in the moments before the blending chute lower portion 170 arrives at the receiving position, and so that no portion of the blending chute lower portion is over a vacuum opening 204 once it has arrived at the receiving position. The vacuum openings create a negative pressure in the blending chute 130, 170 which takes a short time to equalize once the blending chute arrives at the receiving position. By discharging immediately as the blending chute 130, 170 arrives at the receiving position, air entering the upper opening of the blending chute 130 to equalize the pressure can be used to encourage flavouring and/or product along the blending chute.

A blending chute of an alternative construction is shown in FIGS. 11A to 11D. In this embodiment, the product is discharged from an annular opening (not shown), generating a falling, cylindrical stream of product, while the flavouring is discharged along an axis concentric with the annular opening, such that it falls concentrically within the falling, cylindrical stream of product. A funnel shaped deflection surface 230 is provided above a blending chute 270, with a lower opening 232 of the deflection surface 230 being located within an upper opening 272 of the blending chute 270. The blending chute 270 has a funnel shaped upper portion that transitions into a cylindrical lower portion. The deflection surface 230 deflects the falling, cylindrical stream of product inwards, so that the falling stream of product is converging on the central axis of the blending chute 270 as it enters the upper opening of the blending chute. In some embodiments, the funnel shaped upper portion of the blending chute 270 may cooperate with the deflection surface 230 to provide additional deflection of the falling stream of product towards the central axis. Alternatively, the funnel shaped upper portion of the blending chute may deflect the falling stream of product in place of the deflection surface 230. Meanwhile, the flavouring is dispensed into the blending chute 270 by dispensing member 220 such that it falls along the central axis of the blending chute. The deflection of the product towards this central axis, along which the flavouring is falling, together with proper timing of the dispensing of the product and flavouring causes the product and flavouring to intersect within the blending chute 270, with the product being coated in flavouring as the two pass through the blending chute.

While only the blending chute region of this embodiment is shown in the Figures, it will be appreciated that this blending chute could be incorporated into the blending apparatuses discussed above, along with the various features described as being preferable. Additionally, it will be appreciated that the concentric arrangement is not limited to flavouring falling within a falling cylinder of product, and alternatively the flavouring could be discharged into the funnel shaped deflection surface 230, thereby being made to converge on an axis along which product is falling within the blending chute.

The invention claimed is:

1. A blending apparatus for coating product in flavouring comprising:
    a product dispenser (10, 110) configured to dispense a falling stream of product along a first trajectory;
    a flavouring dispenser (20, 120) configured to dispense a falling stream of flavouring along a second trajectory separate from the first trajectory;
    a blending chute (30, 130) for receiving the dispensed product and flavouring as they fall along the first and second trajectories respectively, the blending chute comprising an upper opening and a lower opening separate from the upper opening; and characterised by
    a deflection surface (31), wherein the deflection surface is a part of a funnel-shaped upper portion of the blending chute (30, 130) located between the upper opening and the lower opening, wherein the deflection surface is configured to deflect at least the falling stream of product, thereby bringing the falling stream of product and the falling stream of flavouring together while both are still falling from the upper opening towards the lower opening by causing the falling stream of product and the falling stream of flavouring to intersect, wherein the product dispenser is configured to dispense the falling stream of product directly into the blending chute, and wherein the flavouring dispenser is configured to dispense the falling stream of flavouring directly into the blending chute.

2. The blending apparatus according to claim 1, wherein the blending chute (30, 130) is movable from a first position, at which it receives the product and flavouring, to a second position.

3. The blending apparatus according to claim 2, wherein the blending chute (30, 130) is configured to be moved from the first position towards the second position while the falling stream of product and the falling stream of flavouring fall through the blending chute.

4. The blending apparatus according to claim 1, wherein the blending chute (30, 130) comprises a closeable lower opening (180) at a downstream end of the blending chute, the blending chute being configured to hold the received product and flavouring therein before discharging.

5. The blending apparatus according to claim 2, wherein the blending chute is a first blending chute, and wherein the apparatus further comprises a second blending chute; wherein
    the second blending chute is movable to the first position after the first blending chute is moved away from the first position.

6. The blending apparatus according to claim 5, wherein the first and second blending chutes are coupled to one another such that movement of the first blending chute away from the first position causes movement of the second blending chute towards the first position.

7. The blending apparatus according to claim 2, wherein the blending chute is configured to discharge the received product and flavouring at a discharge position, the discharge position being laterally offset from the first position.

8. The blending apparatus according to claim 5, wherein the first blending chute and second blending chute are coupled such that they are rotatable about a common axis (161), wherein rotation of the blending chutes in a first direction moves each of the blending chutes sequentially between the first position and the second position.

9. The blending apparatus according to claim 1, wherein the flavouring dispenser (20, 120) is located over both the upper opening (32) and the lower opening (36) of the blending chute.

10. The blending apparatus according to claim 1, further comprising a controller (50) for controlling the relative times at which the product dispenser (10, 110) and flavouring dispenser (20, 120) dispense product and flavouring.

11. The blending apparatus according to claim 1, wherein the product dispenser (10, 110) dispenses product at a product dispense position and the flavouring dispenser (20, 120) dispenses product at a flavouring dispense position, wherein the product dispense position and the flavouring dispense position are laterally offset from one another.

12. The blending apparatus according to claim 1, wherein the flavouring dispenser is configured to dispense a solid granular flavouring.

13. A method for coating product in flavouring, comprising the steps:
    dispensing a falling stream of product from a product dispenser (10, 110) along a first trajectory;
    dispensing a falling stream of flavouring from a flavouring dispenser (20, 120) along a second trajectory separate from the first trajectory;
    receiving the discharged product and flavouring in a blending chute (30, 130) as they fall along the first and second trajectories respectively, the blending chute comprising an upper opening and a lower opening separate from the upper opening; characterised by
    deflecting at least the falling stream of product using a deflection surface (31) that is a part of a funnel-shaped upper portion of the blending chute (30, 130) located between the upper opening and the lower opening so as to bring the falling stream of product and the falling stream of flavouring together while both are still falling from the upper opening towards the lower opening by causing the falling stream of product and the falling stream of flavouring to intersect, thereby coating the product in the flavouring, wherein the product dispenser is configured to dispense the falling stream of product directly into the blending chute (30, 130).

14. The method according to claim 13, wherein at least one of dispensing product and dispensing flavouring comprises allowing the product/flavouring to fall under gravity.

15. The method according to claim 13, further comprising moving the blending chute (30, 130) from a first position, at which it receives the product and flavouring, to a second position.

16. The method according to claim 15, comprising moving the blending chute (30, 130) from the first position towards the second position while the first falling stream of product and the first falling stream of flavouring fall through the blending chute.

17. The method according to claim 15, wherein the blending chute is a first blending chute, and further comprising moving a second blending chute to the first position after moving the first blending chute away from the first position; and subsequently dispensing product so as to generate a second falling stream of product;

dispensing flavouring so as to generate a second falling stream of flavouring;

deflecting at least the second falling stream of product using a deflection surface so as to bring the second falling stream of product and the second falling stream of flavouring together while both are still falling by causing the second falling stream of product and the second falling stream of flavouring to intersect, thereby coating the product in the flavouring; and receiving the dispensed product and flavouring in the second blending chute.

18. The method according to claim 17, comprising moving the first blending chute away from the first position while the first falling stream of product and the first falling stream of flavouring fall through the first blending chute and comprising simultaneously moving the second blending chute toward the first position.

19. The method according to claim 15, comprising discharging the received product and flavouring at a discharge position, the discharge position being laterally offset from the first position.

* * * * *